Patented Jan. 19, 1954

2,666,790

UNITED STATES PATENT OFFICE 2,666,790

DIBENZYL DERIVATIVES OF HYDROXY ALKYL SUBSTITUTED ALIPHATIC DIAMINES

William W. Williams, Easton, Pa., and Albert F. Strobel, Phillipsburg, N. J., assignors to General Aniline & Film Corporation, New York, N. Y., a corporation of Delaware No Drawing. Application July 19, 1951, Serial No. 237,668

5 Claims. (Cl. 260—570.9)

The present invention relates to N,N'-dibenzyl-N-hydroxy alkyl aliphatic diamines which are particularly useful as gas fading inhibitors for dyeings on cellulose derivatives.

It is well known that many otherwise desirable dyes for cellulose derivatives suffer from the disadvantage that they are not fast to gas fumes, that is, the dyeings produced therewith become duller and change shade after exposure to such gases. While this phenomenon is not restricted to blue dyes derived from anthraquinone, it is particularly noticeable with such dyes because the gas fading effect is found to be more marked in the blue region of the spectrum. The anthraquinone blues and violets on cellulose derivatives have the characteristic of being extremely fast to light, washing, dry cleaning, and the like, and are most desirable dyes on cellulose derivatives excepting for the peculiarity they possess of changing to a pink or grey shade in the presence of coal gas.

This tendency of dyeings on cellulose derivatives to undergo fading when subjected to gas fumes has been recognized for many years, and since the advent of United States Patent 1,723,230 in 1929, many organic and inorganic bases have been proposed as inhibitors for such gas fading. While many of the compounds so suggested have attributes which recommend their use in the stated relationship, nevertheless none of the compounds have all of the attributes necessary to permit them to completely fulfill the task of inhibiting gas fading to the degree desired in commercial application.

United States Patent 2,017,119 discloses as inhibitors for gas fading various aralkylamines. However, due to the large amount of such compounds which are necessary to inhibit gas fading, and due to the only moderate fastness to washing, dry cleaning, and sublimation of such compounds, they have found little commercial use as inhibitors.

N,N'-diphenyl ethylenediamine is disclosed in United States Patent 2,416,380. This compound, while permanent, has the marked peculiarity that it tends to develop a color of its own on exposure to gas fumes, as a consequency of which it changes a pastel blue dyeing to a green shade.

There are many requirements which a gas fading inhibitor must meet in order to be acceptable from a practical standpoint. These requirements are as follows:

(1) It must prevent fading of the dyed cellulose derivative when exposed to gas.

(2) It must be and remain colorless, i. e., introduce no color of its own when exposed to gas. (This criterion, as noted above, is important for pastel dyeings where any color introduced by the inhibitor would effect a marked change in shade.)

(3) It must give no discoloration on prolonged exposure to sunlight.

(4) It must be fast to dry cleaning and wet washing.

(5) It must be fast to sublimation.

(6) It must be odorless and non-toxic.

(7) In order to save an additional step in the preparation of the dyed material the inhibitor should be suitable for direct dyeing along with the dye in the dye bath or suitable for combining with the cellulose acetate before extrusion.

We have discovered a group of new compounds which meet all of the above requirements. They have the following general formula:

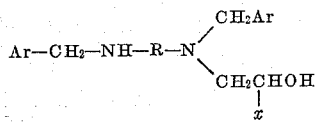

wherein Ar represents a phenyl radical, R represents a lower alkylene radical (i. e., a divalent saturated lower aliphatic hydrocarbon radical), and $x$ is selected from the group consisting of hydrogen and methyl.

These new compounds may be prepared by the reaction of a benzyl halide with a hydroxy alkyl alkylene diamine of the type

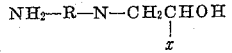

using an acid binding agent in a water-organic medium as described in the examples below. The hydroxy alkyl alkylene diamine may be prepared by the reaction of equimolar amounts of alkylene oxide and alkylene diamine under conditions such as are described in Example 3 below.

As examples of the alkylene radical R in the general formula may be mentioned ethylene; methylethylene; 1,3-propylene; 2-methyl-1,3-propylene; 3,3,3-trimethyl-1,2-propylene; 1,2-dimethylethylene. The phenyl radical Ar may be, for example, phenyl, alkylphenyl, e. g. tolyl, ethylphenyl, butylphenyl, and the like, halogenophenyl, e. g. chlorophenyl, bromophenyl, dichlorophenyl, dibromophenyl, etc., alkoxyphenyl, e. g. anisyl, ethoxyphenyl, propoxyphenyl, etc., carbalkoxyphenyl, e. g. carbomethoxyphenyl, carbethoxyphenyl, carbopropoxyphenyl, etc., aryloxyphenyl, e. g. phenoxyphenyl, methylphenoxyphenyl, etc., cyanophenyl, etc.

The following examples are illustrative of the invention but it will be understood that variations and substitutions may be made within the scope of the claims.

These novel compounds may be prepared in the manner illustrated by the first four of the following examples and the application of these new materials is illustrated in Examples 5, 6 and 7.

*Example 1*

Preparation of

[structure: benzyl-NH-CH₂-CH₂-N(CH₂-benzyl)(CH₂CH₂OH)]

104 parts by weight of aminoethyl ethanolamine, 264 parts of benzene, and 30 parts of distilled water were added together in a suitable vessel. The two-phase mixture was heated to 60° C. Into this mixture was dripped during one-half hour 57 parts of benzyl chloride keeping temperature between 60° and 65° C. The material was stirred for five hours at 60–65° C. After three hours the pH was taken (by withdrawing a small sample, slurrying it with water, and measuring pH with a pH meter). The pH was 9.6, and two hours later the pH was still constant at 9.6. The material was then cooled to 50° C. and 17.5 parts of NaOH pellets were added. The mixture was stirred until the caustic dissolved; the pH, measured as above, became 11.35.

Then a second portion of 57 parts of benzyl chloride was dripped in over a one-half hour period. It was stirred until the pH (as measured above) became constant (three and one-half hours required).

Then a second portion of 17.5 parts of NaOH pellets was added. The mixture was stirred for one-half hour until all the NaOH had reacted (pH became constant at 11.5).

A third portion of 57 parts of benzyl chloride was added over a fifteen minute period, and the mixture stirred for four hours. A corresponding third portion of 17.5 parts of NaOH pellets was then added, and the mixture was stirred for two hours (pH became 10.8).

A fourth portion of 57 parts of benzyl chloride was added in fifteen minutes, and the mixture heated for four hours. An addition of 17 parts of NaOH pellets was then made over a twenty minute period. The mix was stirred one hour; pH became 10.6.

Then 200 parts of water plus 30 parts of 40% NaOH were added, the mixture thoroughly shaken and the layers separated. The upper benzene layer was then distilled at atmospheric pressure to a top temperature of 135° C. removing the benzene. The remaining material of weight 244 parts was the desired product in a crude form.

*Example 2*

Preparation of the compound:

[structure: H₃C-C₆H₄-CH₂-NH-CH₂-CH₂-N(CH₂-C₆H₄-CH₃)(CH₂-CH₂OH)]

This compound may be prepared by the procedure of the compound in Example 1, except that 63.4 parts of p-methylbenzyl chloride (commercially available Ohio-Apex Co.) is used in each place where 57 parts of benzyl chloride is used in Example 1.

*Example 3*

Preparation of

[structure: benzyl-N(H)-CH₂-CH₂-N(CH₂-benzyl)(CH₂-C(OH)(CH₃)-H)]

Preparation of

Preparation of H₃C-C(H)(OH)-CH₂-N(H)-CH₂-CH₂NH₂

300 parts of ethylene diamine was charged into a 1-liter autoclave. The autoclave was closed and heated to 100° C., and into it was pumped (at 15 lb. pressure) over a period of five hours, a total of 58 parts of 1,2 propylene oxide

[structure: (CH₃-CH-CH₂) epoxide]

After all the propylene oxide was added, the material was stirred at 100° C. for one hour. The end of the reaction could be determined when the pressure of propylene oxide fell no lower.

The autoclave was opened and the material discharged. The product was fractionally distilled through a 16-inch column of glass helices. The first (and major) product distilled was ethylene diamine (b. p. 117° C.—atmos. pressure). When no more ethylene diamine would distil, the product remaining was essentially

[structure: H₃C-C(H)(OH)-CH₂-N(H)-CH₂-CH₂-NH₂]

The benzylation of

[structure: H₃C-C(H)(OH)-CH₂-N(H)-CH₂-CH₂-NH₂]

to give

[structure: H₃C-C(H)(OH)-CH₂-N(CH₂-benzyl)-CH₂-CH₂-N(H)(CH₂-benzyl)]

was carried out like the benzylation described in Example 1, except that where 104 parts of hydroxy ethyl ethylene diamine were used (=1 mol HOCH₂-CH₂-N(H)-CH₂-CH₂NH₂)

in Example 1, 118 parts of

[structure: CH₃-C(H)(OH)-CH₂-N(H)-CH₂-CH₂NH₂]

were used in the present case.

*Example 4*

Preparation of

[structure: (CH₃)(H₃C)-C₆H₃-CH₂-N(H)-CH₂-CH₂-N(CH₂-C₆H₃(CH₃))(CH₂-C(H)(OH)-CH₃)]

This compound was prepared exactly as in Example 1, except that in this example 118 parts of

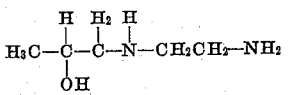

were used in place of the 104 parts of

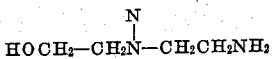

and 70 parts of

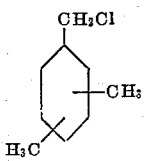

were used wherever 57 parts of

were used in Example 1.

*Example 5*

Application of the compound

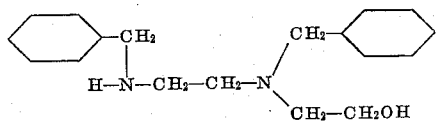

as a gas-fading inhibitor on cellulose acetate: 1.6 parts of the compound

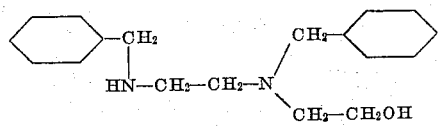

were mixed with 0.4 part of a surface active agent obtained by the reaction of isooctyl phenol and ethylene oxide. The two above materials are miscible. This mixture was then added to 5,000 parts of warm water (50° C.) and 100 parts of cellulose acetate silk cloth which has been previously dyed with 1,4-di-(monomethylamino)-anthraquinone (0.6% on weight of cloth) were introduced into the resulting bath. The silk was worked while gradually raising the temperature to 80° C. and then for an additional one-half hour to one hour. Upon completion of the operation the cellulose acetate silk was removed, washed with dilute soap and water, rinsed with water and dried. The blue color of the treated material had much better resistance to acid fumes than cloth not after-treated with the new compound.

*Example 6*

Preparation of spirit-soluble dye from monazo dyestuff salt of the compound

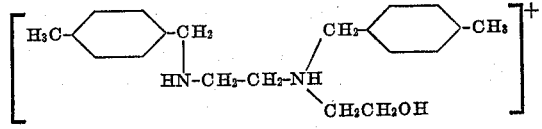

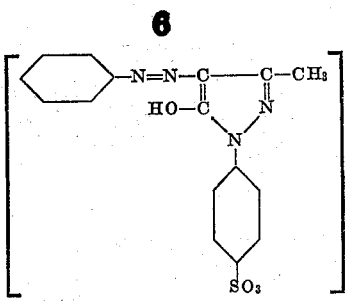

38 parts of the monazo dye

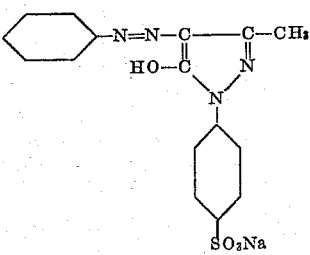

were slurried with 500 parts of water and treated with 20 parts conc. HCl. The sodium salt of the dye was converted by this procedure into the insoluble free acid form of the dye:

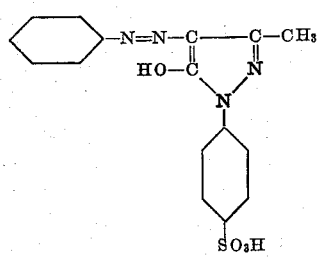

This ppt. was filtered off and washed with water. The presscake was sucked down sharply, then removed from the funnel and reslurried with 400 parts of acetone. To the acetone slurry was added 28.4 parts of the compound:

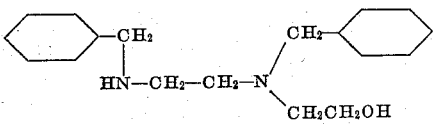

The acetone-dye-amine slurry was refluxed (55° C.) for two hours, after which the acetone was distilled off. The product was dried to give the dye

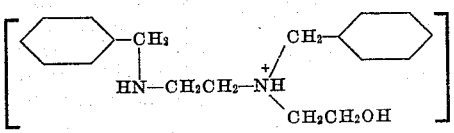

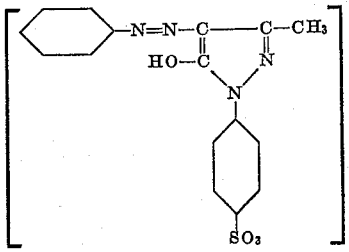

This product was far more soluble in nitrocellulose lacquer solvents (alcohol, acetone, methyl ethyl ketone, toluene, etc.), than was the sodium salt of the dye.

Example 7

A solution of cellulose acetate in acetone was prepared from 10.0 parts cellulose acetate (Hercules LH-1 powder), 48 parts acetone, and 0.4 part of compound:

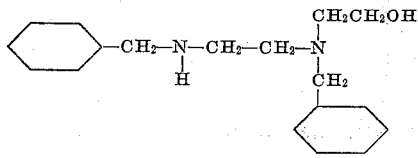

This solution was spread out on a sheet of plate glass, then drawn down into a film using a Bird film applicator. After evaporating to dryness, the film containing the anti-fume agent was peeled off, and dyed a medium shade (by dyeing for one hour at the usual temperature in a dye bath containing 100 mg. dye/300 ml. water) using the dye.

The material so treated and dyed showed much less fading on exposure to gas fumes for 24 hours than a piece of cellulose acetate film similarly treated but in which there was no addition of the compound.

It will be understood that the procedure of Example 1 may be repeated utilizing instead of benzyl chloride alkyl phenyl chlorides, e. g., tolyl, ethylphenyl, butylphenyl, and the like, halogenophenyl, e. g., chlorophenyl, bromophenyl, dichlorophenyl, dibromophenyl, etc., alkoxyphenyl, e. g., anisyl, ethoxyphenyl, propoxyphenyl, etc., carbalkoxyphenyl, e. g., carbomethoxyphenyl, carbethoxyphenyl, carbopropoxyphenyl, etc., aryloxyphenyl, e. g., phenoxyphenyl, methylphenoxphenyl, etc., cyanophenyl, etc.

It will be further understood that instead of aminoethyl ethanolamine other ethanolamine or propanolamine diamines may be used in which the radical connecting the nitrogens may be ethylene; methyl ethylene; 1,3-propylene; 2-methyl-1,3-propylene; 3,3,3-trimethyl-1,2-propylene; 1,2-dimethylethylene; etc.

While the formula given in Example 1, for instance, shows benzyl substituents on each nitrogen it will be understood that the product of Example 1 may be a mixture in which some molecules have both benzyl radicals attached to one nitrogen, i. e., the nitrogen not containing the hydroxy alkyl.

Materials other than cellulose acetate may be used with the anti-gas faders of the present application. They are also useful with fibers or fabrics containing cellulose formate, cellulose propionate, cellulose butyrate, cellulose-acetate-propionate, cellulose-acetate-butyrate, cellulose methyl ether, cellulose ethyl ether, cellulose benzyl ether, and the like.

We claim:

1. Compounds having the following general formula:

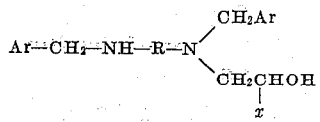

wherein Ar represents a radical selected from the group consisting of phenyl and lower alkyl substituted phenyl, R represents an ethylene radical, and $x$ is selected from the group consisting of hydrogen and methyl.

2. The compound:

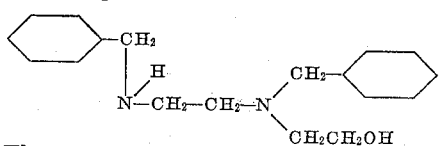

3. The compound:

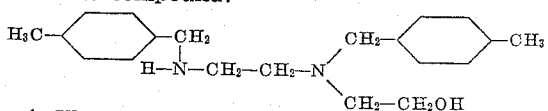

4. The compound:

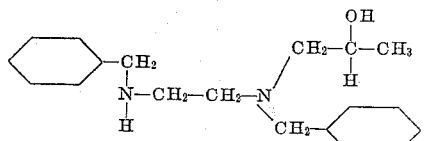

5. The compound:

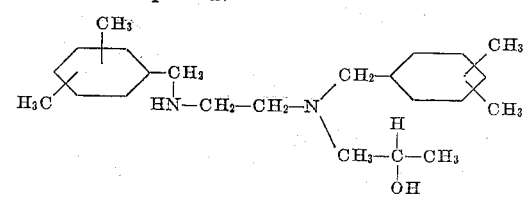

WILLIAM W. WILLIAMS.
ALBERT F. STROBEL.

References Cited in the file of this patent

UNITED STATES PATENTS

| Number | Name | Date |
|---|---|---|
| 1,467,096 | Carroll | Sept. 4, 1923 |
| 2,017,119 | Ellis et al. | Oct. 15, 1935 |
| 2,276,619 | Kulz | Mar. 17, 1942 |
| 2,383,361 | Bass | Aug. 21, 1945 |
| 2,416,380 | Collie et al. | Feb. 25, 1947 |
| 2,518,393 | Smith | Aug. 8, 1950 |
| 2,541,089 | Nikawitz | Feb. 13, 1951 |
| 2,566,289 | Mastin | Aug. 28, 1951 |

FOREIGN PATENTS

| Number | Country | Date |
|---|---|---|
| 594,624 | Great Britain | Nov. 14, 1947 |